United States Patent [19]

Johnston et al.

[11] Patent Number: 5,781,776
[45] Date of Patent: Jul. 14, 1998

[54] INDUSTRIAL CONTROLLER PERMITTING PROGRAM EDITING DURING PROGRAM EXECUTION

[75] Inventors: David A. Johnston, Mentor; Charles M. Rischar, Chardon; Ronald E. Schultz, Solon; Otomar Schmidt, Richmond Heights, all of Ohio

[73] Assignee: Allen Bradley Company, Inc., Milwaukee, Wis.

[21] Appl. No.: 551,441

[22] Filed: Nov. 1, 1995

[51] Int. Cl.⁶ .................................................. G06F 9/44
[52] U.S. Cl. ............... 395/704; 395/182.03; 395/182.06
[58] Field of Search ........................... 395/701, 702, 395/182.03–182.06, 704

[56] References Cited

U.S. PATENT DOCUMENTS

| 4,745,572 | 5/1988 | Wilburn | 364/900 |
| 4,831,517 | 5/1989 | Crouse et al. | 364/200 |
| 5,005,152 | 4/1991 | Knutsen | 364/900 |
| 5,504,902 | 4/1996 | McGrath et al. | 395/700 |
| 5,623,665 | 4/1997 | Shimada et al. | 395/182.03 |

*Primary Examiner*—James P. Trammell
*Assistant Examiner*—Kakali Chaki
*Attorney, Agent, or Firm*—Keith M. Baxter; John M. Miller; John J. Horn

[57] ABSTRACT

A method of editing a real-time control program as it controls equipment is provided in which the editing occurs in a second area of memory and integrated into the pre-existing program by means of conditional jump instructions concatenated to that edited material. The pre-existing program is uninterrupted by the editing process except for a change of single instructions which do not affect the results of the execution but redirect the execution thread of that control program to be conditionally connected to the edited material. This single writing of single instructions, which do not affect execution results, precludes the possibility of the controller executing partially edited programs. The jump instructions are conditional on a test edit pointer to allow instantaneous implementation of the edits and a simple return to unedited instructions simply by changing the state of the flag.

12 Claims, 5 Drawing Sheets

INDUSTRIAL CONTROLLER PERMITTING PROGRAM EDITING DURING PROGRAM EXECUTION

FIELD OF THE INVENTION

The present invention relates to industrial controllers for the real-time control of industrial processes and, in particular, to an industrial controller that permits its control program to be edited while that program is controlling industrial equipment.

BACKGROUND OF THE INVENTION

Industrial controllers are special purpose computers used for controlling industrial processes or manufacturing equipment.

Under the direction of a stored program, the industrial controller examines a series of inputs reflecting the status of a controlled process or controlled equipment and changes outputs affecting control of the process or equipment. The inputs and outputs are mostly binary, that is "ON" or "OFF"; however, analog inputs and outputs taking on a continuous range of values and multi-bit digital values, are also used.

Industrial controllers are frequently programmed in "relay ladder" language where instructions are represented graphically by "contacts" and "coils" of virtual relays connected and arranged in ladder-like rungs across a power and ground rail. This relay ladder language, with its input contacts and output coils, reflects the emphasis in industrial control on the processing of large amounts of input and output data.

Relay ladder language also reflects the fact that most industrial control is "real-time"; that is, an ideal industrial controller behaves as if it were actually composed of multiple relays connected in parallel rungs to provide outputs in essentially instantaneous response to changing inputs.

Other industrial control languages are also used including: function block languages which represent instructions as functional blocks having inputs and outputs connected to the inputs of other functional blocks; sequential function chart languages which represent the control process as a series of discrete states responsive to historical input and output data, and structured text languages which most closely resemble conventional computer programs such as FORTRAN and C.

In a typical relay ladder logic program, each rung composed of contact and output coil instructions will be evaluated in sequence. At each rung, inputs represented by the contacts are read from memory (as obtained from inputs from the controlled process or the previous evaluation of coils of other rungs). These inputs are combined according to the logic reflected in the connection of the contacts into one or more branches within the rungs. Contacts in series across a rung represent a Boolean AND logic whereas contacts in different branches and thus in parallel across the rung represent Boolean OR logic. Special "normally closed" contacts provide Boolean NOT logic. Typically, a single output coil at the end of each rung is set or reset based on the evaluation of that rung and this setting or resetting is reflected in the writing to memory.

Generally, the instructions of each rung (and each rung) is stored in electronic memory at a contiguous block of memory addresses. Then the instructions are executed in a predetermined order according to their location in memory from lowest to highest subject to the effects of jump and branch instructions which move the point of execution of the program to a new address defined by those instructions. In a simple ladder logic program there are no jump or branch instructions. In all ladder logic programs a given rung is executed in its entirety before the execution of the next rung is begun, i.e., the program doesn't jump or branch out of a rung and then return to complete that rung.

Normally a control program will be edited a number of times during its development and later as the control process is further refined. Editing a control program may involve one of three operations: (1) the deletion of instructions, (2) the insertion of new instructions or (3) the modification of existing instructions.

In conventional computing, a program is typically edited "off-line," i.e, a program is written or modified with an editor during a period of time when the program is not being executed. The edited program is then compiled, loaded into the computer and executed. To the extent that such programs do not involve real-time control, interruptions in their execution for editing are acceptable.

In contrast, in industrial computing, it may be necessary to perform editing "on-line," that is, editing of the control program while the program is being executed and controlling equipment. On-line editing avoids the inconvenience and expense of stopping the controlled process while editing is performed. On-line editing may also be desired where the effect of small changes in the program cannot be discerned without operation of the process. In this case, on-line editing permits a simple and immediate comparison of alternative forms of the program through direct observation of the controlled process.

Although on-line editing is a desirable feature for the development of control programs for real-time control industrial processes, on-line editing is not easily realized. A single controller may change its executing program while the program is executing, for example, by using a multi-tasking operating system. A background task can make the changes in the primary task of the control program. Nevertheless, if such changes are extensive, the real-time control will be interrupted while the control program is suspended until the changes are complete. If the control program is not suspended for the entire period during which the editing is performed, the controller may begin executing a part of the program that has only been partially changed risking erratic execution of the control process. The likelihood of erratic operation is increased when the changes in the program occur at a number of separate locations in the program.

Further compounding the difficulty of performing on-line editing is the fact that often the editing requires that large amounts of new material be inserted into the program. This new material requires that additional space be freed in the body of the program. In the worst case, this may involve rewriting a significant proportion of the program's instructions to higher addresses to free the necessary space in memory. This rewriting can be extremely time consuming.

SUMMARY OF THE INVENTION

The present invention provides a method of on-line editing of real-time industrial control programs that permits complex changes in a pre-existing control program to be made while the control program is executing and without the risk of erratic program execution caused by execution of a partially edited program.

Generally, a first instruction of a portion of a pre-existing program is replaced with a jump instruction conditional on the setting of a test edit flag. If the test edit flag is set, the jump redirects the execution of the pre-existing program to a set of new, edited instructions in a second area of memory not necessarily contiguous with the pre-existing program. A second jump then returns execution back to the pre-existing program.

Significantly, the invention allows the majority of the editing operations to be performed in a second area of memory without interference with the execution of the pre-existing program. Only as a last. step in the editing process, a single instruction in memory is changed and, thus, there is no possibility of a partially edited program being executed and little or no execution time impact on the edited tasks or other tasks concurrently running in the processor.

In addition. because only a single instruction in the pre-existing program is modified and no new instructions are added into or removed from the body of the pre-existing program. there is no need to shuffle the pre-existing program through memory to open or close up gaps left by the editing process.

Specifically then. the present invention provides a method of editing a pre-existing section of a real-time control program as may be executed on an industrial controller including the steps of loading the pre-existing section into a first area of memory and loading the new section into a second area of memory. A first jump instruction is inserted into the second area of memory at the end of the new section, the first jump instruction when executed, causing the industrial controller to jump around the pre-existing section. During the execution of the real-time control program, a first instruction of the pre-existing section is replaced with a second jump instruction which when executed causes the industrial controller to jump to a first instruction of the new section.

Thus. it is one object of the invention to permit arbitrary editing of a section of an industrial control program while that program is being executed by placing the edited material in a second area of memory and modifying only a single instruction of the program to be edited to provide smooth and predictable implementation of editing changes.

The second instruction in the pre-existing section in the first area of memory may be replaced with a third jump instruction, which, when executed, causes the industrial controller to jump around the pre-existing section only when an edit flag is enabled. A fourth jump instruction may be placed in the second area of memory at the beginning of the new section, the fourth jump instruction, when executed, causing the industrial controller to jump to the second instruction of the pre-existing section only when an edit flag is disabled.

Thus. it is another object of the invention to make the necessary edited changes in the structure of the program prior to activating those changes. By conditioning the jump instructions on an edit flag, virtually instantaneous switching between the edited and unedited program may be obtained for comparison of the operation of the industrial controller. This approach also permits changes in the program to be "removed" leaving the program as it was prior to the editing session—as may be-desirable if the edited changes are unacceptable.

In an alternative embodiment used for inserting new material after the pre-existing section, the first jump instruction inserted in the second area of memory at the end of new section, when executed, causes the industrial controller to jump to a second instruction of the pre-existing section after a first instruction of the pre-existing section.

Thus, it is another object of the invention to permit additional rungs to be added to a program without requiring time consuming or disruptive shuffling of the instructions to memory to provide space for the new instructions.

A first instruction of the pre-existing section may be replaced with a jump instruction which when executed causes the industrial controller to jump to an end of the pre-existing section.

Thus. it is yet another object of the invention to permit sections of an executing program to be deleted without disruption of the program or the need to shuffle instructions of the program into the gap created by the deleted instructions.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

CONTROL ENVIRONMENT

Figure 1:
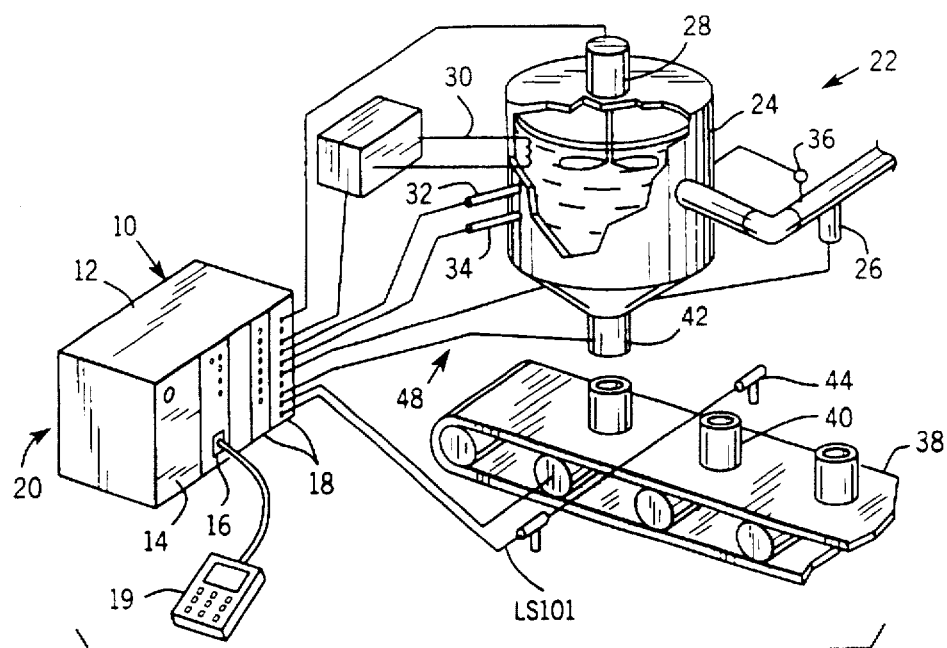
FIG. 1 is a perspective view of a simplified industrial control application including control of a conveyor line by an industrial controller employing the method of the present invention and showing a handheld terminal for programming and editing the program for the industrial controller.

Referring now to FIG. 1, an industrial controller 10 for use with the present invention may execute a control program expressed as a relay ladder diagram so as to control a number of elements on controlled equipment 22.

In the process example shown. I/O modules 18 are connected to sensors and actuators on a mixing tank 24 to control the flow of materials into the tank via a valve 26 and the temperature and agitation of those materials via an agitator 28 and a heater 30 under feedback control based on signals obtained from a thermal couple 32, a pressure transducer 34 and a flow sensor 36.

The industrial controller 10 also controls, in this example, a conveyor belt 38 having cans 40 to be filled from the tank 24, a spigot 42 from the tank 24, and the positioning of the conveyor belt 38. The industrial controller 10 receives signals from a limit switch 44 shown as a photoelectric beam so as to correctly position the containers under the spigot 42 for filling.

These control processes may be time sensitive and thus it is important that the industrial controller 10 execute its control program efficiently.

Attached to the industrial controller 10 is programming terminal 19 which provides a method of programming the industrial controller 10 with a relay ladder logic diagram and of editing that program as will be described. The relay ladder logic diagram is displayed on the terminal 19 and transmitted to the industrial controller 10 for storage in memory. It will be understood that the terminal 19 alternatively may be a desk-top unit remote from the industrial controller 10 but linked to the industrial controller for the communication of the relay ladder logic diagram.

Controller Hardware

Figure 2:
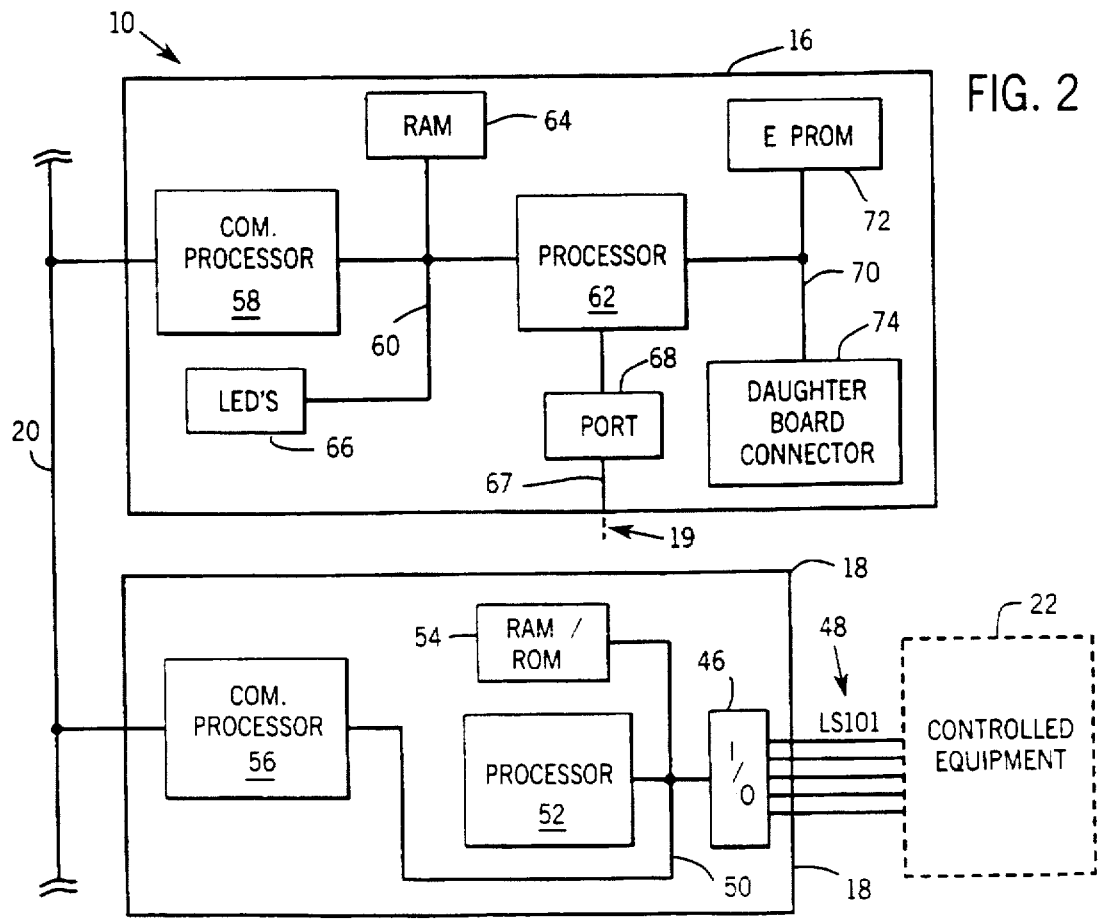
FIG. 2 is a block diagram of the controller of FIG. 1 showing the processor module, I/O module, and the latter's connection to the controlled equipment of FIG. 1.

Referring to FIGS. 1 and 2, the industrial controller 10 includes generally a rack 12 holding one or more controller modules including a power.supply 14, a processor module 16 and one or more input/output, "I/O" modules 18 connected together via a backplane 20 passing the rear of the rack 12.

I/O modules such as 18 are generally known in the art and operate to receive signals and transmit them to the processor module 16 under the operation of their processor 52. The processor module 16 receives inputs from controlled equipment 22 via the I/O modules 18 and provides outputs to the controlled equipment 22 by those same I/O modules 18.

The signal lines 48 from the controlled equipment 22 are received by the I/O module 18 at interface circuitry 46. The interface circuitry 46 contains protection circuitry, such as optical isolators, and conversion circuitry, such as analog to digital or digital to analog circuitry, for converting the I/O signals 48 to digital representations that may be transmitted on an internal bus 50 of the I/O module 18.

The internal bus communicates with an I/O module processor 52, a memory unit 54 composed generally of random access and read-only memory (RAM/ROM) and a communication processor 56 connecting the I/O module 18 to a high-speed backplane 20 for communication with other modules, and in particular, the processor module 16. Processor 52 thus may receive instructions and programming from the processor module 16 as will be described below. The I/O module 18 may be constructed according to methods well understood in the art.

A communication processor 58 in the processor module 16 handles the communication protocols of the high-speed backplane 20 and relays information between that high-speed backplane 20 and an internal bus 60 of the processor module 16. The internal bus 60 is also connected to the processor 62 of the processor module as well as random access memory ("RAM") 64 and a front panel LED display 66. The processor 62 provides a separate serial port 68 used for diagnostics and programming and another internal bus 70 communicating with erasable programmable read-only memory (EPROM) 72 and a daughter board connector 74 which may be used for memory expansion on a separate card.

Generally, during operation, the processor 62 reads instructions of the relay ladder logic diagram from memory and transfers data to and from RAM 64, that data representing desired inputs and outputs interchanged by the communication processor 58 with the I/O module 18 and thus with the controlled equipment 22. The processor 62 may also execute one or more background tasks, such as an editing task to be described below, concurrently with the execution of relay ladder instructions. Such multi-tasking is provided according to methods well known in the art by sharing the processor 62 on a time basis among the various tasks. The general architecture and operation of the industrial controller 10 thus far described will be familiar to those of ordinary skill in the art.

Controller Software

The Program to be Edited

Figure 4:
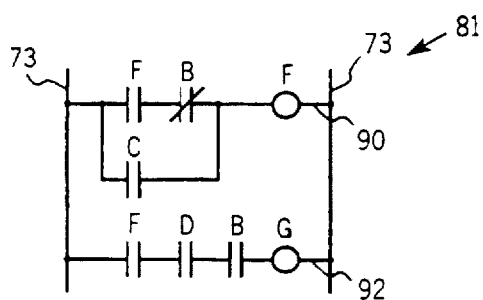
FIG. 4 is an example relay ladder diagram as it is displayed on the terminal of FIG. 1 and which may be executed by the controller of FIG. 1 as a pre-existing program.

Prior to any editing, a program is created according to well known procedures and the particular equipment or process to be controlled. Referring to FIG. 4, an example relay ladder logic program 81 having two rungs 90 and 92 spanning power rails 73, is shown such as may be created by a user. Relay ladder diagrams of this type are well known in the art.

Rung 90 of this example relay ladder logic program 81, and as displayed to the programmer on terminal 19, has a series connected normally open contact labeled F wired in series with normally closed contact labeled B. These series contacts are shunted by parallel connected normally open contact labeled C and the combination connected in series with output coil labeled F. Rung 92 has normally open contacts labeled F, D and B connected in series with output coil labeled G.

Labels F, B, C, and D represent variables stored in memory and originally derived either from external signals received by the I/O module 18 of the industrial controller 10 or from the coils of other rungs. Labels of output coils F and G also represent variables stored in memory and used either by the control process, as transmitted to the controlled equipment 22 process via the I/O module 18, or by a contact of another rung.

Normally a control program will include hundreds of rungs similar to 90 and 92, each of which is sequentially evaluated by the industrial controller during its operation.

During normal execution of the program 81 by the industrial controller 10, the industrial controller 10 reads memory locations assigned to the particular variables F, B, C, and D and performs a logical evaluation of the rung determined by the topology of the rung 80, i.e., how the particular contacts are arranged in parallel or in series. The result of this evaluation provides the variables F and G of the rungs' coils which are then stored in memory.

Figure 3:
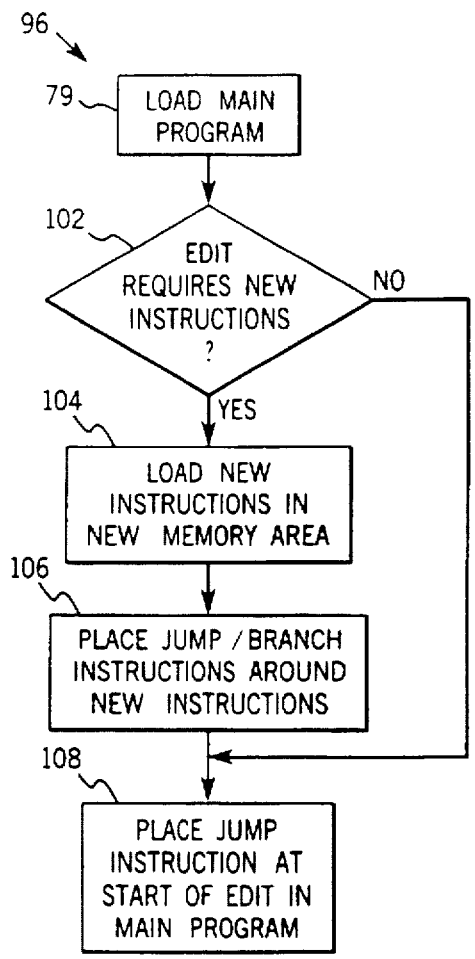
FIG. 3 is a simplified flowchart showing the steps of the present invention where editing operations including deletions, insertions, and replacements are undertaken in a separate area of memory and then activated, as a final step with the insertion of a single jump instruction in the pre-existing program.

Referring now to FIGS. 3 and 4, the program 81 to be edited is entered into the industrial controller 10 and displayed on the terminal 19 as indicated by process block 79. Although the relay ladder logic program 81 is a graphical language, it may be stored within the controller's memory as text source code. In this representation, the contacts, coils and topology are represented by three letter mnemonics, according to conventions well known in the art. A basic set of mnemonics are summarized in Table I:

TABLE I

| Relay Ladder Logic Instruction Mnemonics | Meaning |
| --- | --- |
| SOR | Start of Rung |
| BST | Branch Start |
| XIC | Normally Open Contact (examine if closed) |
| XIO | Normally Closed Contact (examine if open) |
| NCB | Next Branch |
| BND | Branch End |
| OTE | Output Coil (Output Enable) |
| NOP | No Operation |

These mnemonics provide a compact form for storing the relay ladder logic program 81 in computer memory of the industrial controller 10. The conversion between the graphical representation of the relay ladder program and the mnemonic form is performed by the terminal 19 operating according to an internally stored program. In this process, the diagram of FIG. 4 is translated to the following mnemonic form.

TABLE II

SOR BST XIC(F) XIO(B) NXB XIC(C) BND OTE(F) NOP
SOR XIC(F) XIC(D) XIC(B) OTE(G) NOP

Figure 6:
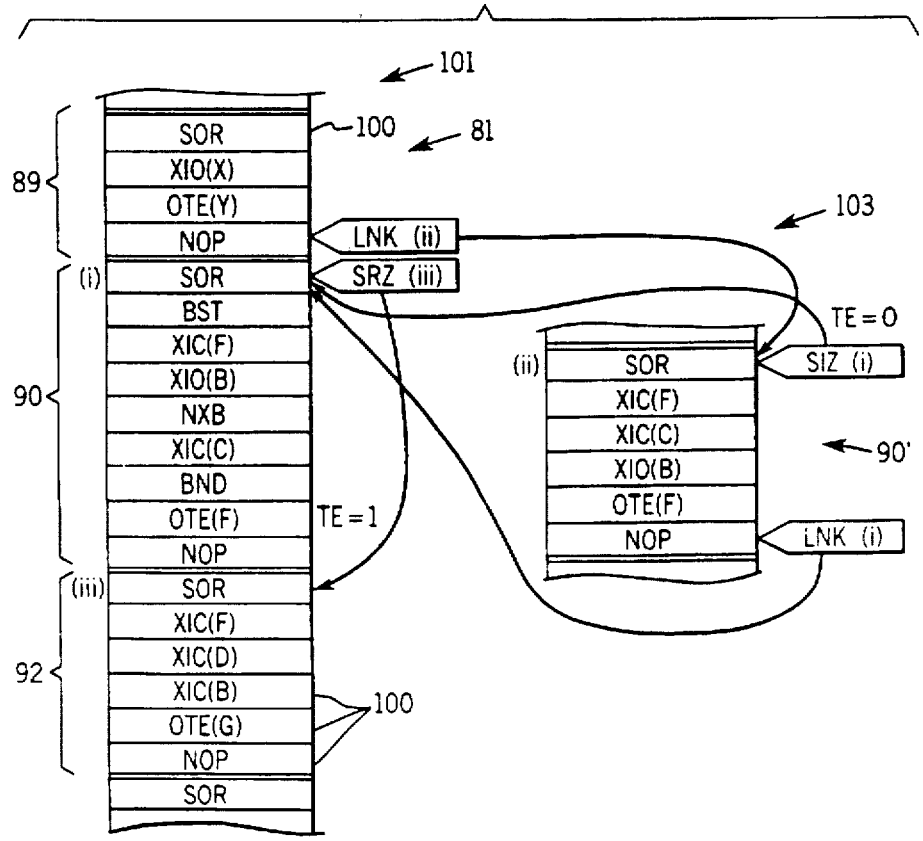
FIG. 6 is a schematic representation of the memory of the controller of FIG. 1 showing the actual implementation in memory of the replacement of FIG. 5.

Referring now to FIGS. 2 and 6, entering the program 81 to be edited into the industrial controller 10 requires the storing of the mnemonics of Table II in computer memory 64. Computer memory 64 provides a plurality of memory locations 100, each having a sequential numerical address.

Referring still to FIG. 6, a code representing each mnemonic of Table II is loaded into consecutive sequential memory locations 100; the mnemonics of rung 92 immediately succeeding those of rung 90. This form of storage of the control program 81 makes the most efficient use of memory 64 but, as has been discussed, limits the ability to edit the program without extensive rewriting of the contents of memory locations.

As shown, each rung may be distinguished from the succeeding rung by the initial SOR instruction. Thus, the editing program, as will be described, may determine the starting point and ending point of each rung within memory automatically.

The final NOP instruction may be replaced with a LNK instruction pointing to the next rung if the rung, for some reason, cannot be stored contiguously as described above. The LNK instruction causes a jump in the execution sequence of the program and will be described below.

Execution of the Program

During normal execution of the program 81, a program counter (not shown) in the processor 62 holds an address for one such memory location 100. The instruction in this memory location 100 is "fetched" and received by the processor 62 for execution. The program counter may then be incremented and the next instruction fetched in a repeated fetch/execute cycle.

The repetitive incrementation of the program counter is interrupted when an instruction is a "link" "branch" or "jump" -type instruction (henceforth all termed jump instructions). With these instructions, the program counter is not incremented but loaded with the jump instruction's operand which is a new address of a memory location 100.

Loading of the program counter causes the execution of the program to jump to a new memory location 100 which is not necessarily one greater in address than the memory location 100 holding the previously executed instruction.

The addresses of the set of memory locations 100 at which instructions are fetched together define an "execution thread" for the program. For instructions that are not jump or branch instructions, the execution thread proceeds sequentially through the memory locations 100. At branch or jump instructions, the execution thread jumps to a new instruction somewhere in memory 64.

The Editing Program

Referring to FIG. 3, an editing program 96 may reside within EPROM 72 (shown in FIG. 2) and may be executed concurrently with the control program by processor 62 according to time sharing techniques generally understood in the art. This and the following editing operations may be performed as an editing task and executed concurrently with the execution of the pre-existing program in a multi-tasking environment such as is well known in the art. Thus, the editing task is executed by the-processor 62 at times when it is not executing other tasks including the pre-existing program 81.

The editing procedure makes use of the following nonstandard instructions, the mnemonic of which are provided in table IV. The operation of each instruction will be described below.

TABLE III

| Editing Instruction Mnemonics | Meaning |
| --- | --- |
| SIZ | Start Insert Zone |
| SRZ | Start Replace Zone |
| LNK | Link |
| SDZ | Start Delete Zone | a) Replacing Instructions

Figure 5:
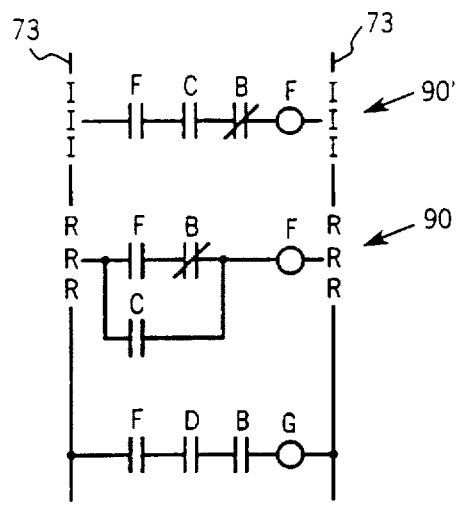
FIG. 5 shows a replacement editing operation performed by the program of FIG. 4 as displayed on the terminal of FIG. 1.

Referring now to FIGS. 3 and 5, during operation of the industrial controller, it may be desired to replace rung 90 with new rung 90'. In this case at process block 102, the user indicates through terminal 19 that new instructions are to be added to the program currently being executed and the editing program proceeds to process block 104. Specifically, the user identifies the rung 90 to be replaced and selects that rung by keyboard commands. These commands cause the power rails 73 flanking the rung 90 to be replaced by letters "R" indicating that rung is to be replaced. The rung 90 is also highlighted by intensifying its lines on the display screen.

At process block 104, the new instructions to replace rung 90 are entered by the user either through keyboard commands or by accessing a pre-stored file. These new instructions are also displayed as rung 90', beneath the rungs 90 and with power rails 73 replaced by letters "I", but without highlighting.

Normally, if new instructions 90' are to be entered into the pre-existing program 81, space must be made at memory locations 100 within the body of the program 81. In order to preserve the pre-existing program 81 as stored, making this space generally involves taking the last instruction of the pre-existing program 81 and moving it downward in memory by a specific amount equal to the number of new instructions. This process must be repeated for each preceding instruction until the point of insertion of the new instructions is reached. During this shifting operation, gaps will appear within the body of the program which, if executed, will produce unpredictable errors in the control process. Typically, as an instruction is moved, it will, for a period of time, appear at two places in the program at once, with disastrous consequences.

Referring also to FIG. 6, the present invention avoids these problems by storing these new instructions of rung 90' in a separate area of memory 103 not necessarily contiguous with the memory 101 holding rungs 90 and 92 but typically at the end of all rungs forming the control program 81. Thus the program 81 is not affected.

Here the example new rung 90' includes series connected normally open contacts F and C and normally closed contact B followed by a coil F as may be represented by the following mnemonics:

TABLE IV

SOR XIC(F) XIC(C) XIO(B) OTE(F) NOP

As indicated by process block 106 of FIG. 3, jump instructions are next placed on either side of the rung 90' to integrate it into the pre-existing program.

Specifically, the following four steps are performed in this sequence:

First, the SOR instruction at the beginning of the new rung 90' is replaced with an SIZ instruction having an operand of (i) thus pointing to the SOR instruction at the beginning of rung 90. The SIZ instruction fulfills the same role as the SOR instruction previously described, i.e., it sets a rung flag to an initial TRUE state. This rung flag is modified by the later instructions of the rung and ultimately determines the state of the rung's output coil. The SIZ instruction also performs a conditional jump to its operand depending on the state of a "test edit" flag. If the test edit flag is FALSE, then the SIZ instruction will cause the controller to jump to its operand address, i.e., the first instruction of rung 90. If the test edit flag is TRUE, the SIZ instruction allows the program counter to increment which causes the next succeeding instruction of rung 90' to be fetched and executed.

Second, the NOP instruction at the end of rung 90' is replaced with a LNK instruction having an operand of (i). The LNK instruction causes an unconditional jump to its operand, in this case the first instruction of rung 90. Both of these first and second modifications take place in the memory 103 and hence do not affect the ongoing execution of the program 81.

Third, the first SOR instruction of rung 90 is replaced with an SRZ instruction. The SRZ instruction, like the SIZ instruction, causes a conditional jump to its operand depending on the state of the test edit flag. However, unlike the SIZ instruction, the SRZ instruction will cause the controller to jump to its operand address if the test edit flag is TRUE and otherwise allows the program counter to be incremented permitting execution of the instruction following the SRZ instruction. Because the test edit flag is initially FALSE, this addition of the SRZ instruction into the program 81 while it is executing, will not affect the execution of that program. When the test edit flag is FALSE, the SRZ instruction is identical in function to the SOR instruction it replaces.

Fourth and finally, the NOP instruction at the conclusion of the rung 89 immediately preceding rung 90 is changed to a LNK instruction having as an operand the first instruction of the new rung 90'.

With the replacement of the final NOP instruction of preceding rung 89, the executed program 81 jumps always to the top of new rung 90'. Then, depending on whether the test edit flag is TRUE or FALSE, either rung 90' or 90 will be executed.

The loading of the new rung 90' and the addition of the jump instructions described with respect to process block 106 may all be done while the pre-existing program 81 is executing on a time share basis. Importantly, the pre-existing program 81, as stored in memory 64, is in no way disrupted by rewriting its instructions downward as would be required if new rung 90' were to be added into the pre-existing program 81 directly.

Importantly, the writing of the final LNK instruction into rung 89 requires only a single operation and thus cannot be interrupted by the time sharing of the processor 62 between tasks. In other words, there is no possibility that the processor 62 will attempt to execute a partially edited program.

The additional instructions of LNK, SIZ, and SRZ instructions which cause a loop to the new rung 90' do not add a significant delay to the execution of rungs 90 and in practice are unnoticeable. As previously described and referring to FIG. 5, the new rung 90' will be displayed above the old rung 90 without highlighting indicating that the new rung 90' is not being executed as a result of the state of the test edit flag.

The new rung 90' may thus be implemented by changing the state of the test edit flag. This causes the new rung 90' to be highlighted and the old rung 90 to lose its highlighting. With the test edit flag TRUE, the SIZ instruction at the beginning of rung 90' does not cause a jump to old rung 90 but allows the instructions of rung 90' to be executed. The SRZ instruction at the top of rung 90, conversely, is activated causing the program to proceed to the top of rung 92 thus avoiding rung 90 altogether.

Once the new program is loaded into memory as a replacement rung, the LNK, SIZ and SRZ instructions may all be placed automatically within the computer memory 64 by the firmware in the EPROM which makes use of the clear demarcation of the new and old instructions provided by the Sxx instructions. Thus, the jump addresses for each of these instructions may be automatically computed. The SIZ instruction at the top of rung 90' takes as its operand, the first Sxx instruction of the rung 90 being replaced as does the LNK instruction at the end of a new rung 90'. In the same way, the SRZ instruction directs itself to the Sxx instruction immediately following the rung being replaced. The identification of Sxx instructions rather than SOR instructions allows multiple editings of the rungs to occur without problem.

It will be understood that this technique may be used for most computer programs which must be executed in real-time even if they are not written in relay ladder logic. The beginning and ending of the edited zone must be marked by the user if they are not obvious-from context as is the case with relay ladder logic in which editing is done on a rung by rung basis. Also in this case, the instruction of the pre-existing program that is replaced by the LNK instruction must have its function duplicated in the execution thread through the new rung 90'. In general, this may be done by placing a duplicate of this first instruction being replaced at another point along the execution thread or else ensuring that the first instruction of each portion of the program to be edited is a NOP instruction. Thus it can be seen that the same principles described for relay ladder logic may be readily applied to an arbitrary real-time programming language.

b) Inserting Instructions

Figure 7:
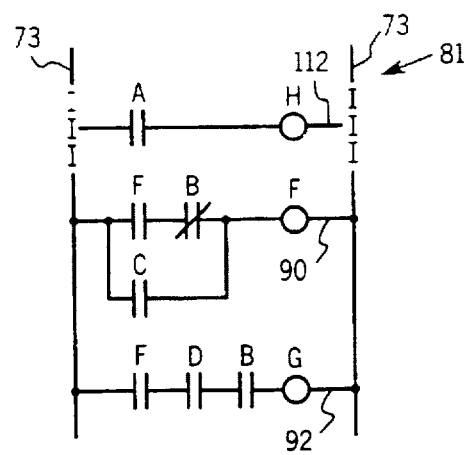
FIG. 7 is a figure similar to that of FIG. 5 showing an insertion editing operation.
Figure 8:
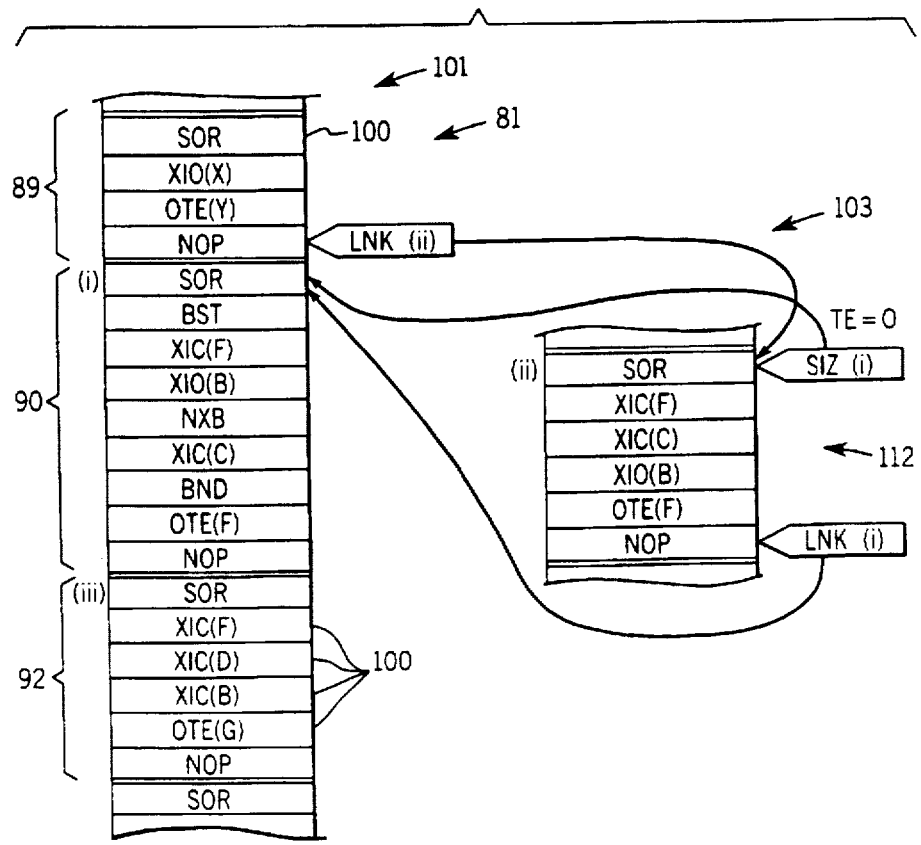
FIG. 8 is a figure similar to FIG. 6 showing the implementation of the insertion of FIG. 7 in memory.

Referring now to FIGS. 7 and 8, it may be desired to simply insert a new rung 112 without replacing or modifying rungs 90 and 92. In this example, the new rung being inserted has a single contact A in series with an output, coil H represented by the mnemonics:

TABLE V

SOR XIC(A) OTE(H) NOP

Referring again to FIG. 3, these new instructions of rung 112 are entered into a second portion of memory 123 at process block 104, and then at process block 106, the flanking jump instructions placed about the new instructions of rung 112. In contrast to the replacement editing described above, in this case the SOR instruction at the beginning of the rung 90, to follow-the inserted rung 90' is not replaced with a SRZ instruction. In all other respects the modification of the program is the same as described with respect to FIG. 6.

At the instant after process block 108 is completed, assuming that the test edit flag is FALSE, the execution thread passes from the LNK instruction at the bottom of rung 89, to the SIZ instruction at the top of rung 112, to the SOR instruction at the top of rung 90. Despite this circuitous execution thread, the pre-existing program 81 is effectively executed as normal with no disruption because only a single instruction has been modified and this modifying act cannot be interrupted by time sharing of the processor or dual access of the memory 64 before it is complete—because it is a single operation.

As shown in Fig.7, the new rung 112 may be displayed on the display device of FIG. 1 and indicated by the letters I replacing its power rails 73. This new rung is not highlighted because the test edit flag is FALSE.

When the test edit flag is set to TRUE by the user, rung 112 becomes highlighted and the execution thread per FIG. 8 proceeds from the LNK instruction at the bottom of rung 89 to the SIZ instruction at the top of rung 112, then through the instructions of rung 112 to the LNK instruction succeeding those instructions of rung 112 and then by means of the LNK instruction back to the SOR instruction at the top of rung 90. As can be seen in this case, both rung 112 and rung 90 are executed.

This same approach may be used with an arbitrary computer language as described before but because the insertion point is well defined, the user need not define an editing zone other than to show where in the instruction the change is to be made.

c) Deleting Instructions

Figure 9:
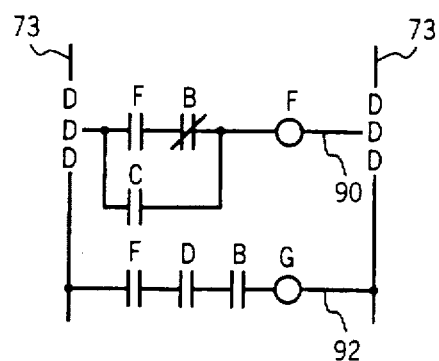
FIG. 9 is a figure similar to that of FIGS. 5 and 7 showing a deletion editing operation.

Referring now to FIG. 9, in the simplest form of editing, a deletion of a rung, e.g., rung 90, may be performed. As shown in FIG. 3, the editing program may, at decision block 102, branch around process blocks 104 and 108 because there are no new instructions.

Figure 10:
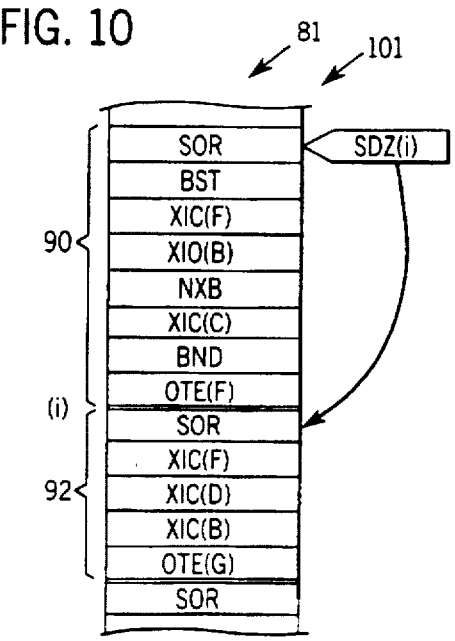
FIG. 10 is a figure similar to FIGS. 6 and 8 showing the implementation of the deletion of FIG. 9 in memory.

Referring also to FIG. 10, in this case, a special instruction SDZ is used to replace the SOR instruction at the beginning of rung 90. The SDZ instruction like the SIZ and SRZ and SOR instructions sets the rung flag to TRUE and conditionally branches depending on the state of the test edit flag.

In this case, if the test edit flag is TRUE, the SDZ instruction causes a branch to the SOR instruction of the succeeding rung in the pre-existing program 81, in this case rung 92. If the test edit flag is FALSE, the SDZ instruction allows the execution thread to drop through to the succeeding instruction, in this case a BST instruction.

Again a graphics display is provided of the editing operation with the rail 73 flanking rung 90 being replaced by the letters "D" indicating a deletion and highlighted when the test edit flag is FALSE.

It will be understood that the edited portions of the program may include a number of rungs spread throughout the pre-existing program 81 and that the editing may be arbitrarily distributed among replacements, insertions and deletions, each of which will be activated simultaneously by changing of the test edit flag. Thus, extremely complex editing may be tested yet the program returned to its original form on an essentially instantaneous basis. If the editing is acceptable, it may be incorporated into the pre-existing program at any time. This incorporation is relatively straightforward and involves reading sequentially through the pre-existing program to find LNK or SDZ instructions and then simply substituting the instructions pointed to by these jump instructions.according to the execution thread which would be followed if the test edit flag were TRUE. These changes make the edits permanent.

In order to apprise the public of the various embodiments that may fall within the scope of the invention, the following claims are made.

I claim:

1. A method of editing a pre-existing section of a real-time control program that may be executed by an industrial controller, the pre-existing section including at least one instruction to be edited, the method replacing the pre-existing section with a new section and comprising the steps of:

a) loading the real-time control program including the pre-existing section into a first area of memory;
   b) loading the new section into a second area of memory;
   c) inserting a first jump instruction in the second area of memory at the end of the new section, the first jump instruction, when executed, causing the industrial controller to jump around the pre-existing section; and
   d) during the execution the real-time control program, replacing a first instruction of the pre-existing section with a second jump instruction which, when executed, causes the industrial controller to jump to a first instruction of the new section.

2. The method of claim 1 wherein the first jump instruction causes the industrial controller to jump first to a second instruction of the pre-existing section after the first instruction of the pre-existing section and including the steps of:

(e) inserting as the second instruction in the pre-existing section in the first area of memory a third jump instruction, which, when executed, causes the industrial controller to jump around the pre-existing section only when an edit flag is enabled; and
   (f) inserting a fourth jump instruction in the second area of memory at the beginning of the new section, the fourth jump instruction, when executed, causing the industrial controller to jump to the second instruction of the pre-existing section only when an edit flag is disabled.

3. The method of claim 1 wherein the instructions are relay ladder instructions and wherein the sections are at least one rung of a real-time control program written in relay ladder instructions.

4. The method of claim 1 wherein the instructions are relay ladder instructions and wherein the sections are rungs of a real-time control program written in relay ladder instructions.

5. A method of editing an pre-existing section of a real-time control program that may be executed by an industrial controller, the pre-existing section including at least one instruction to be edited, the method inserting a new section after the pre-existing section and comprising the steps of:

a) loading the real-time control program including the pre-existing section into a first area of memory;

b) loading the new section into a second area of memory;

c) inserting a first jump instruction in the second area of memory at the end of the new section, the first jump instruction, when executed, causing the industrial controller to jump to a second instruction of the pre-existing section after a first instruction of the pre-existing section; and d) during the execution the real-time control program, replacing a first instruction of the pre-existing section with a second jump instruction which, when executed, causes the industrial controller to jump to a first instruction of the new section.

6. The method of claim 5 including the step of:

(e) inserting as a first instruction in the new section a third jump instruction, which when executed, causes the controller to jump to the second instruction of the pre-existing section only when an edit flag is disabled.

7. The method of claim 5 wherein the instructions are relay ladder instructions and wherein the sections are rungs of a real-time control program written in relay ladder instructions.

8. A method of editing a pre-existing section of a real-time control program that may be executed on an industrial controller, each rung which may only be executed as an entirety, the method deleting the pre-existing section and comprising the steps of:

a) loading the instructions of the real-time control program including the pre-existing section into a first area of memory;

b) during the execution of the real-time control program, replacing a first instruction of the pre-existing section with a jump instruction which, when executed, causes the industrial controller to jump to an end of the pre-existing section.

9. The method of claim 8 wherein the jump instruction, when executed, causes the industrial controller to jump to an end of the pre-existing section only when an edit flag is enabled.

10. An industrial controller used to execute a real-time control program of instructions collected into logical rungs, each rung which may only be executed as an entirety, the first instruction of each rung being a start rung instruction, the control program including at least one pre-existing rung to be edited, the industrial controller comprising an electronic computer executing a stored program to provide the following:

a) means for loading the instructions of the real-time control program into a first area of memory;

b) means for executing the control program to control an industrial process in real-time;

c) means for loading instructions of a new rung into a second area of memory;

d) means for inserting a first jump instruction in the second area of memory at the end of the new rung, the first jump instruction, when executed, causing the industrial controller to jump around the pre-existing rung in the first area of memory; and e) means for, during the execution of step (b), replacing an instruction preceding the start rung instruction of the pre-existing rung in the first area of memory with a second jump instruction which, when executed, causes the industrial controller to jump to a first instruction of the new rung in the second area of memory.

11. An industrial controller used to execute a real-time industrial control program of instructions collected into logical rungs, each rung which may only be executed as an entirety, the first instruction of each rung being a start rung instruction, the control program including at least one pre-existing rung to be edited, the industrial controller comprising an electronic computer executing a stored program to provide the following means:

a) means for loading the instructions of the real-time control program into a first area of memory;

b) means for executing the control program to control an industrial process in real-time;

c) means for loading instructions of a new rung into a second area of memory;

d) means for inserting a first jump instruction in the second area of memory at the end of the new section, the first jump instruction, when executed, causing the industrial controller to jump to a second instruction of the pre-existing section after a first instruction of the pre-existing section; and e) means for during the execution of the real-time control program, replacing a first instruction of the pre-existing section with a second jump instruction which, when executed, causes the industrial controller to jump to a first instruction of the new section.

12. An industrial controller used to execute a real-time control program of instructions collected into logical rungs, each rung which may only be executed as an entirety, the first instruction of each rung being a start rung instruction, the control program including at least one pre-existing rung to be edited, the industrial controller comprising an electronic computer executing a stored program to provide the following:

a) means for loading the instructions of the real-time control program into a first area of memory;

b) means for executing the control program to control an industrial process in real-time; and c) means for, during the execution of step (b), replacing a start rung instruction of the pre-existing rung in the first area of memory with a jump instruction which, when executed, causes the industrial controller to jump to a start rung instruction of the following pre-existing rung.

* * * * *